United States Patent
Geibel et al.

(10) Patent No.: US 8,657,122 B2
(45) Date of Patent: Feb. 25, 2014

(54) CLOG RESISTANT MEDIA RETAINER ASSEMBLY

(75) Inventors: John L. Geibel, Butler, PA (US); Christopher J. Ball, McDonald, PA (US)

(73) Assignee: Xylem Water Solutions Zelienople LLC, Zelienople, PA (US)

( * ) Notice: Subject to any disclaimer, the term of this patent is extended or adjusted under 35 U.S.C. 154(b) by 442 days.

(21) Appl. No.: 12/894,754

(22) Filed: Sep. 30, 2010

(65) Prior Publication Data

US 2011/0073549 A1 Mar. 31, 2011

Related U.S. Application Data

(60) Provisional application No. 61/247,023, filed on Sep. 30, 2009.

(51) Int. Cl.
*B01D 24/46* (2006.01)

(52) U.S. Cl.
USPC ........... 210/353; 210/355; 210/489; 210/498; 210/293

(58) Field of Classification Search
USPC .............. 210/269, 275, 289, 291, 293, 321.7, 210/355, 498, 353, 489
See application file for complete search history.

(56) References Cited

U.S. PATENT DOCUMENTS

| | | | |
|---|---|---|---|
| 1,406,340 A | 2/1922 | Brown | |
| 2,315,252 A | 3/1943 | Fraser | |
| 2,701,027 A | 2/1955 | Scoville | |
| 3,428,184 A | 2/1969 | Küper | |
| 3,653,845 A * | 4/1972 | Moravec | ........................ 422/311 |
| 3,956,134 A | 5/1976 | Sturgill | |
| 4,133,766 A | 1/1979 | Adie | |
| 4,196,079 A | 4/1980 | Ward | |
| 4,331,542 A | 5/1982 | Emrie | |
| 4,603,001 A * | 7/1986 | Ward | ............................ 210/791 |
| 5,019,259 A | 5/1991 | Hambley | |
| 5,108,627 A | 4/1992 | Berkebile et al. | |
| 5,122,287 A | 6/1992 | Hsiung | |
| 5,149,427 A | 9/1992 | Brown et al. | |
| 5,156,738 A | 10/1992 | Maxson | |
| 5,167,840 A | 12/1992 | Jaccarino | |
| 5,232,585 A | 8/1993 | Kanow | |
| 5,232,592 A | 8/1993 | Brown et al. | |

(Continued)

FOREIGN PATENT DOCUMENTS

WO 9310879 A1 6/1993
WO 9628234 A1 9/1996

*Primary Examiner* — Matthew O Savage
(74) *Attorney, Agent, or Firm* — The Webb Law Firm, P.C.

(57) ABSTRACT

A media retainer assembly for retaining filter media in a filter assembly includes a top plate for supporting the filter media, the top plate having a top surface, a bottom surface and a plurality of openings extending therethrough; a bottom plate having a top surface and a plurality of openings extending therethrough; and scouring media, the scouring media being adapted to abrade the surfaces of the top and bottom plates. The top plate is connected to the bottom plate such that the top surface of the bottom plate is spaced from the bottom surface of the top plate to define at least one chamber between the top plate and the bottom plate. The top surface of the top plate is in fluid communication with the chamber via the openings in the top plate. The scouring media is supported by the bottom plate within the at least one chamber.

12 Claims, 18 Drawing Sheets

(56) References Cited

U.S. PATENT DOCUMENTS

| | | | |
|---|---|---|---|
| 5,269,920 A | 12/1993 | Brown et al. | |
| 5,328,608 A | 7/1994 | Bergmann et al. | |
| 5,332,497 A | 7/1994 | Shea et al. | |
| 5,407,563 A | 4/1995 | Blake | |
| 5,462,664 A | 10/1995 | Neuspiel | |
| 5,489,388 A | 2/1996 | Brown et al. | |
| 5,554,281 A | 9/1996 | McDougald | |
| 5,639,384 A | 6/1997 | Brown et al. | |
| 5,766,450 A * | 6/1998 | Herman et al. | 210/108 |
| 6,007,713 A | 12/1999 | Michalik | |
| 6,030,529 A | 2/2000 | Biskner et al. | |
| 6,048,132 A | 4/2000 | Kupke et al. | |
| 6,261,453 B1 | 7/2001 | Savage | |
| 6,569,327 B2 * | 5/2003 | Roberts et al. | 210/274 |
| 6,569,328 B1 | 5/2003 | Haggard | |
| 6,797,166 B1 | 9/2004 | Hambley et al. | |
| 6,991,726 B2 | 1/2006 | St. Germain | |
| 7,063,787 B2 | 6/2006 | Jackson et al. | |
| 7,138,056 B2 | 11/2006 | Hambley et al. | |
| 7,192,521 B2 | 3/2007 | St. Germain | |
| 2001/0032813 A1 | 10/2001 | Savage | |
| 2002/0166807 A1 | 11/2002 | Haggard | |
| 2006/0086653 A1 * | 4/2006 | St. Germain | 210/293 |
| 2008/0087592 A1 | 4/2008 | Buchanan | |

* cited by examiner

CLOG RESISTANT MEDIA RETAINER ASSEMBLY

CROSS REFERENCE TO RELATED APPLICATIONS

This application claims priority to U.S. Provisional Patent Application Ser. No. 61/247,023 entitled "Clog Resistant Media Retainer Assembly" filed Sep. 30, 2009, the entire disclosure of which is hereby incorporated by reference.

BACKGROUND OF THE INVENTION

1. Field of the Invention

The present invention relates to a gravity or pressure filter assembly that includes an underdrain block and a bed of granular filter media. More particularly, the present invention relates to a filter assembly that includes a clog resistant media retainer assembly for retaining the filter media on the underdrain block and preventing the build-up of biological and chemical scaling on the retainer assembly.

2. Description of Related Art

Typical gravity or pressure filters use some type of filter media that captures the dirt particles from a liquid being filtered as the liquid passes through the media to an underdrain or collection system. The filter media must be supported so that it will not pass into the underdrain or collection system.

One type of common media support utilizes one or more layers of gravel placed below the filter media to prevent the filter media from passing. Common gravel-less systems use either a slot sized small enough to retain the required media or plastic beads held together chemically or sintered together. Such systems are prone to clogging by biological or chemical scaling, which adheres to the media retainer, thus blocking or clogging the water pathway. The pressure drop across the filter assembly may continue to increase and cause a failure in the system when the head loss across the system exceeds the design pressure drop.

SUMMARY OF THE INVENTION

According to an embodiment of the present invention, a gravity or pressure filter having a layer of granular filter media that captures dirt particles from a liquid filtrate as the liquid passes through the media to a lateral underdrain or collection system is provided. The gravity filter includes a clog resistant media retainer assembly defined between a top media retaining plate, which supports a granular filter media, and a bottom plate, which provides fluid communication between the gravity filter and a lateral underdrain. The media retainer assembly contains clog resistant scouring media supported by the bottom plate. The top plate has a plurality of slots or openings sized to retain the granular filter media above the top plate while allowing filtered liquid to pass through. During backwash of the gravity filter, the scouring media is allowed to move throughout the retainer chamber and abrade the surfaces of the top media retaining plate and the bottom plate to remove biological and chemical scaling built up on the filter plates. To that end, the scouring media is formed by a plurality of shaped particles that each have at least one edge that protrudes from the surface of the particle in order to enhance the contact area of the particle with the open areas of the slots or openings in the top plate. The bottom plate includes various slots or openings that discharge liquid from the media retainer to the underdrain while retaining the scouring media within the retainer. The slots or openings in the bottom plate are large enough to prevent clogging, but small enough to prevent the scouring media from passing through the bottom plate.

According to an embodiment of the present invention, a media retainer assembly for retaining filter media in a filter assembly is provided. The media retainer assembly includes a top plate for supporting the filter media, the top plate having a top surface, a bottom surface and a plurality of openings extending therethrough; a bottom plate having a top surface and a plurality of openings extending therethrough; and scouring media, the scouring media being adapted to abrade the surfaces of the top and bottom plates. The top plate is connected to the bottom plate such that the top surface of the bottom plate is spaced from the bottom surface of the top plate to define at least one chamber between the top plate and the bottom plate. The top surface of the top plate is in fluid communication with the chamber via the openings in the top plate. The scouring media is supported by the bottom plate within the at least one chamber.

The present invention also includes a method of removing biological and chemical scaling from a media retainer including: providing at least one chamber below a bottom surface of the media retainer; providing scouring particles within the at least one chamber; and providing flow of fluid through the chamber to circulate the scouring particles within the chamber such that they abrade the bottom surface of the media retainer.

Further details and advantages of the invention will become clear upon reading the following detailed description in conjunction with the accompanying drawing figures, wherein like parts are designated with like reference numerals throughout.

DESCRIPTION OF PREFERRED EMBODIMENTS

For purposes of the description hereinafter, spatial orientation terms, if used, shall relate to the referenced embodiment as it is oriented in the accompanying drawing figures or otherwise described in the following detailed description. However, it is to be understood that the embodiments described hereinafter may assume many alternative variations and embodiments. It is also to be understood that the specific devices illustrated in the accompanying drawing figures and described herein are simply exemplary and should not be considered as limiting.

Figure 1:
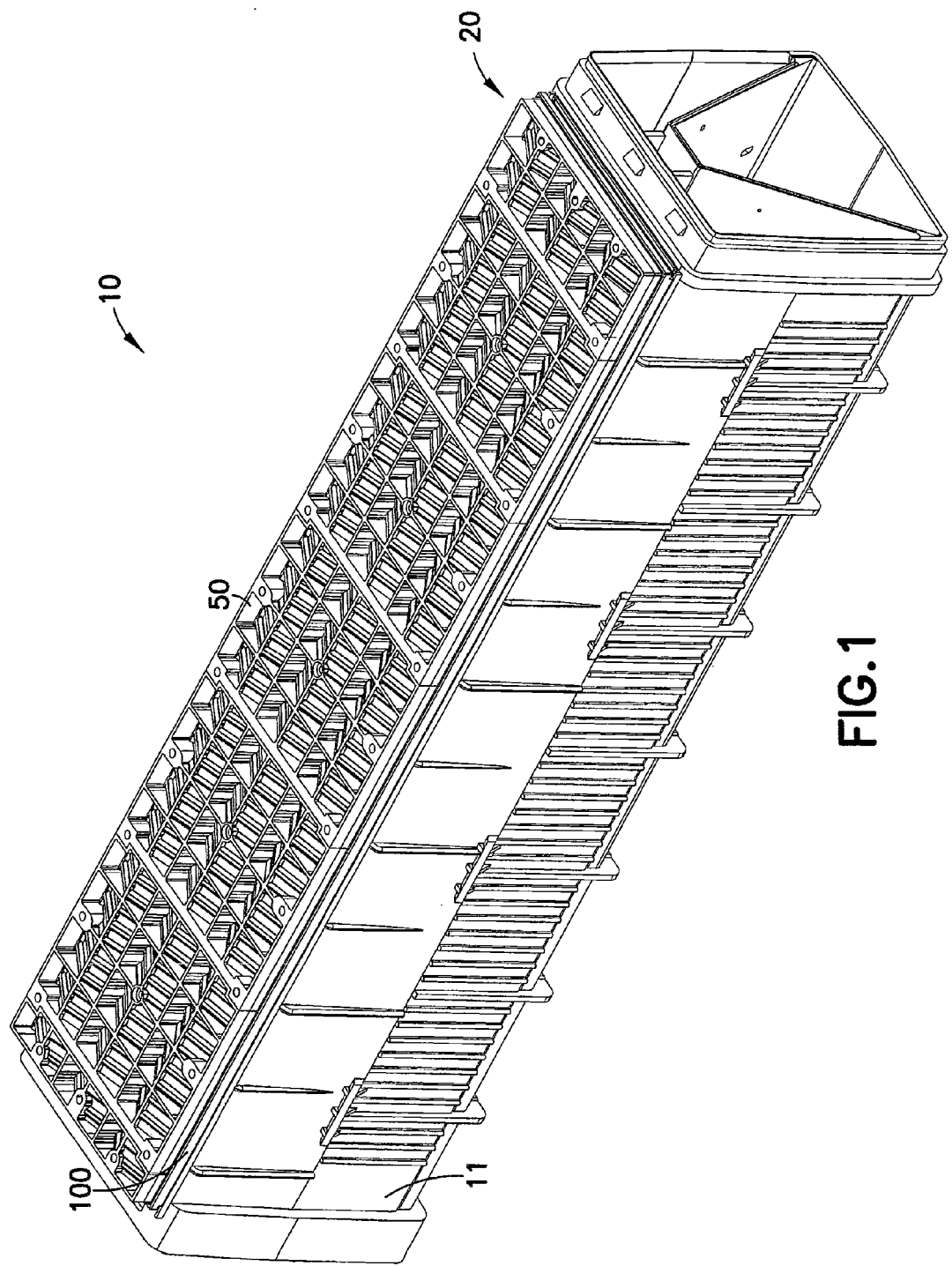
FIG. 1 is a perspective view of a gravity or pressure filter assembly having a clog resistant media retainer assembly according to an embodiment of the present invention.
Figure 2:
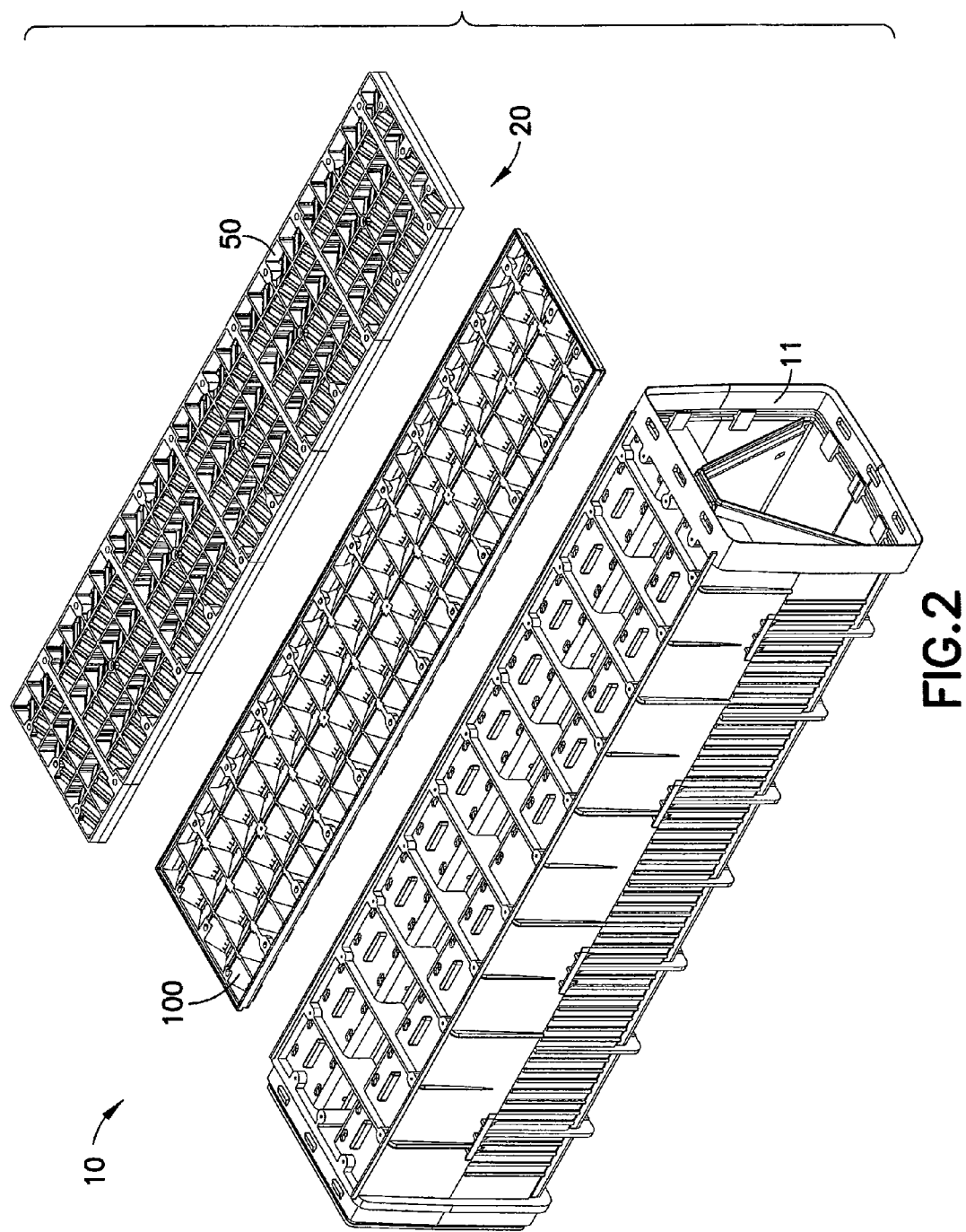
FIG. 2 is an exploded perspective view of the filter assembly shown in FIG. 1.
Figure 3:
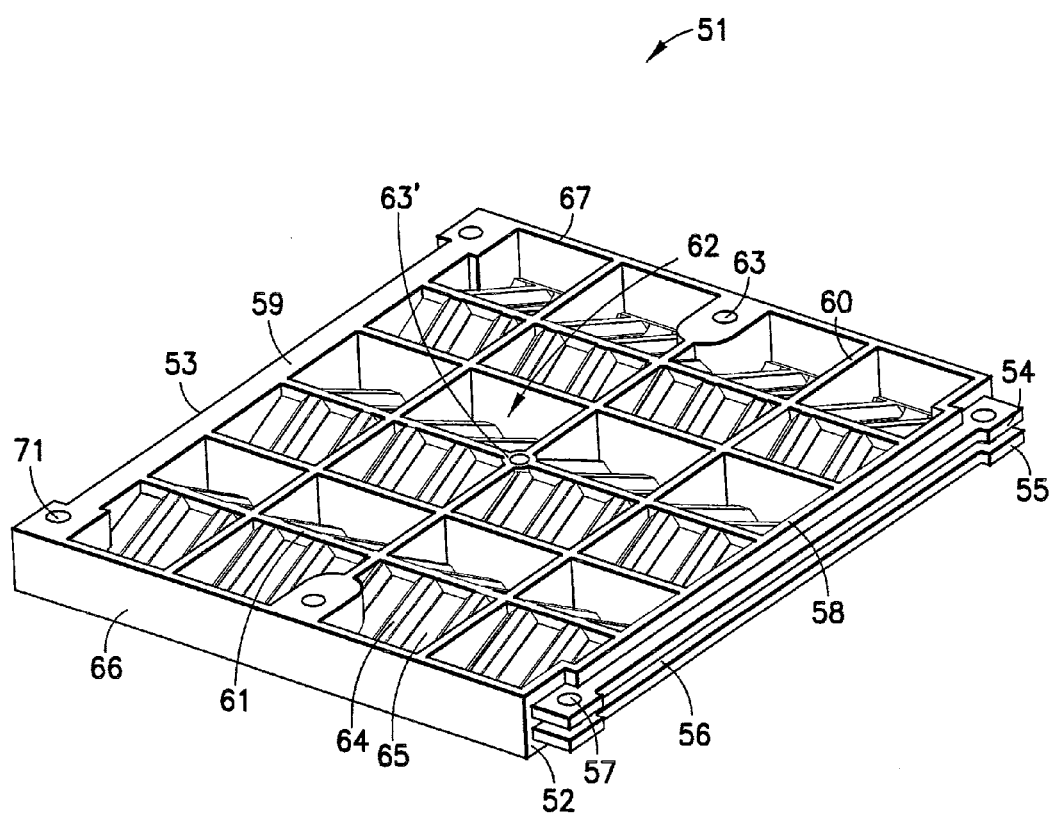
FIG. 3 is a top front perspective view of an intermediate portion of the top plate of the media retainer assembly shown in FIG. 2.
Figure 4:
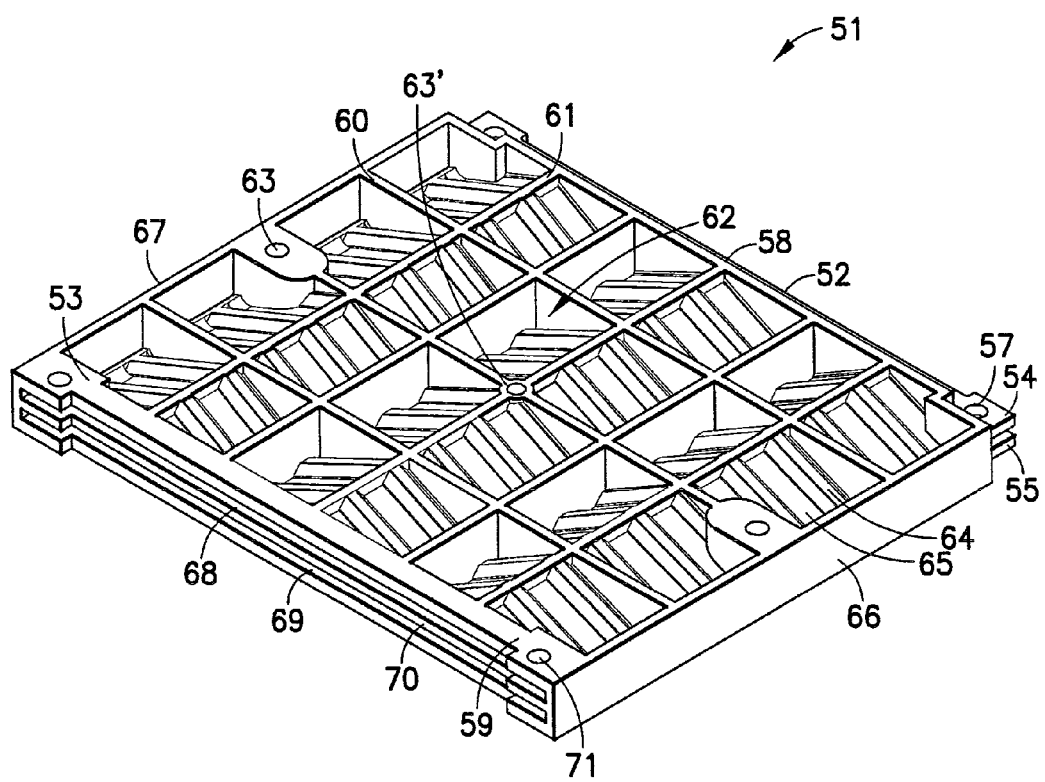
FIG. 4 is a top rear perspective view of an intermediate portion of the top plate of the media retainer assembly.
Figure 5:
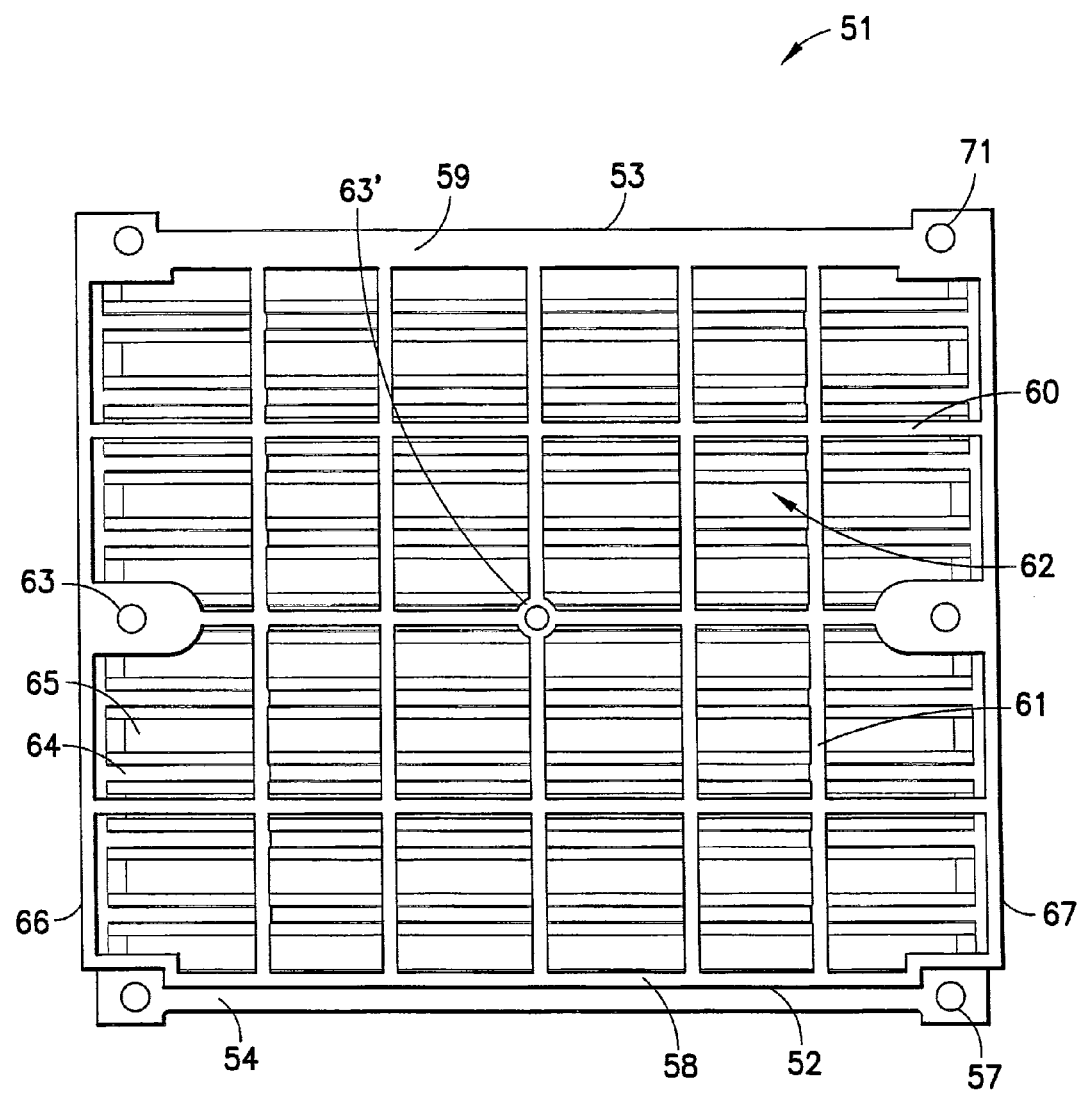
FIG. 5 is a top plan view of the intermediate portion of the top plate of the media retainer assembly.

Referring to FIGS. 1 and 2, a gravity or pressure filter assembly 10 according to an embodiment of the present invention is shown. The filter assembly 10 includes an underdrain block 11 extending in a longitudinal direction and a media retainer assembly 20 mounted to the top of the underdrain block 11 by a plurality of fasteners (not shown). The underdrain block may be of the type discussed in U.S. Pat. No. 5,639,384, which is assigned to the Assignee of the present application and is hereby incorporated by reference in its entirety, and formed via a structural foam process under low pressure. As shown, the media retainer assembly 20 includes a top plate assembly 50, which supports a layer or multiple layers of filter media 12 (shown in FIG. 18) on the filter assembly 10 and a bottom plate 100 supporting the top plate assembly 50 on the underdrain block 11. The filter media 12 acts to remove dirt, debris, chemical and biological contaminants from liquid flowing through the filter assembly 10. It is to be appreciated that the filter media 12 may be of any type known to be suitable by those having ordinary skill in the art, such as multiple layers of sand and gravel.

With reference to FIGS. 1-13, the top plate assembly 50 includes a plurality of separable pieces joined end-to-end across the length of the underdrain block 11. According to an embodiment of the present invention, the top plate assembly includes five (5) intermediate top plates 51 measuring 8" in length (shown in FIGS. 3-7); one (1) first end top plate 80 measuring 4" in length (shown in FIG. 12); and one (1) second end top plate 90 measuring 2" in length (shown in FIG. 13). The plates 51, 80, 90 are joined mechanically by a tongue and groove system to be discussed below and the plurality of fasteners securing the top plate assembly 50 to the underdrain block 11. The plates 51, 80, 90 are injection molded from a thermoplastic material, such as polypropylene, in a high pressure injection molding process, though it is to be appreciated that the plates 51, 80, 90 may be formed from any suitable material and according to any suitable technique known to those having ordinary skill in the art.

As shown, in FIGS. 3-7, each intermediate top plate 51 of the top plate assembly 50 extends between a first end 52, defined by a first end wall 58, and a second end 53, defined by a second end wall 59. Two opposing longitudinal walls 66, 67 extend between the first 58 and second 59 end walls. The intermediate top plate 51 includes a plurality of longitudinally extending ribs 61 extending between the first 58 and second 59 end walls parallel to the longitudinal walls 66, 67 and a plurality of transverse ribs 60 extending between the longitudinal walls 66, 67 parallel to the end walls 58, 59.

The transverse 60 and longitudinal 61 ribs intersect to form a grid with a plurality of compartments 62 defined between the ribs 60, 61. Each compartment 62 includes a plurality of bars 64, 65 extending transversely between two longitudinal ribs 61 or between a longitudinal rib 61 and a longitudinal wall 66, 67. The bars 64, 65 are arrayed side by side between two transverse ribs 60 or between a transverse rib 60 and an end wall 58, 59. The bars 64, 65 are sloped in an alternating manner in the transverse direction, such that the bars 64, 65 in a longitudinal line of compartments 62 extend downward toward the first longitudinal wall 66, while the bars 64, 65 in the adjacent longitudinal line of compartments 62 extend downward toward the second longitudinal wall 67. The ribs 60, 61 may also have a plurality of mounting holes 63 formed therein for allowing fasteners to pass through the top plate assembly 50 and connect the top plate assembly 50 to the bottom plate 100 and the underdrain block 11. A central aperture 63' may also be provided in the middle of the intermediate top plate 51 to allow for pre-assembly of the top plate assembly 50 with the bottom plate 100 containing scouring media before the media retainer assembly 20 is secured to the underdrain block 11.

The intermediate top plates 51 are joined together and mechanically sealed end-to-end by a tongue and groove sealing system, which provides a mechanical seal against passage of filter media 12 and/or scouring media 22 through the top plate assembly 50 between the plates 51, 80, 90. The tongue and groove system includes upper 54 and lower 55 tongues extending from the first end wall 58 of an intermediate top plate 51 so as to leave a gap 56 therebetween. Mounting holes 57 are also formed in the upper 54 and lower 55 tongues. Corresponding upper 68 and lower 69 grooves are formed in the second end wall 59 of an adjacent intermediate top plate 51 with an intermediate portion 70 of the second end wall 59 left between the grooves 68, 69. Mounting holes 71, overlapping the grooves 68, 69 are also formed in the second end wall 59.

Adjacent intermediate top plates 51 are joined together by fitting the upper 54 and lower 55 tongues at the first end 52 of an intermediate top plate 51 into the corresponding upper 68 and lower 69 grooves in the second end 53 of an adjacent intermediate top plate 51, such that the intermediate portion 70 of the second end wall 59 is received within the gap 56 formed between the upper 54 and lower 55 tongues and the mounting holes 57 in the tongues 54, 55 become aligned with the mounting holes 71 in the second end wall 59. The adjacent intermediate top plates 51 may then be further secured by the fasteners passing through the mounting holes 57, 71 which attach the top plate assembly 50 to the bottom plate 100 and the underdrain block 11. It is to be appreciated that the top plates 51 may be secured by additional mechanical methods, such as providing an interference fit between the tongues 54, 55 and corresponding grooves 68, 69, or may be additionally secured by a chemical adhesive, such as glue or epoxy.

Figure 12:
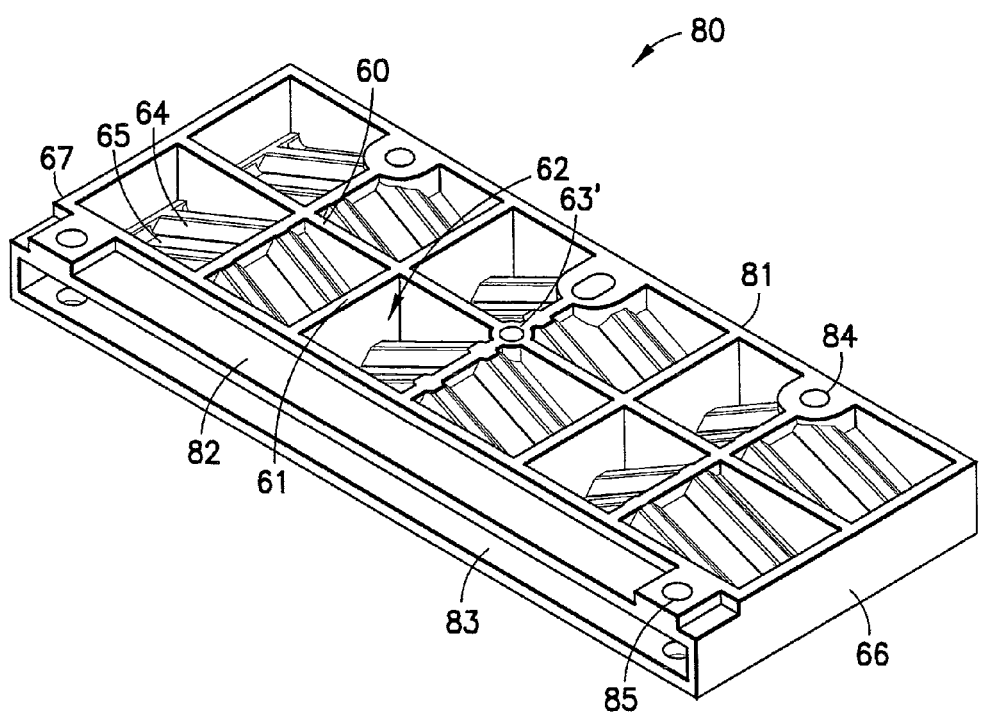
FIG. 12 is a top rear perspective view of an end portion of the top plate of the media retainer assembly shown in FIG. 2.
Figure 13:
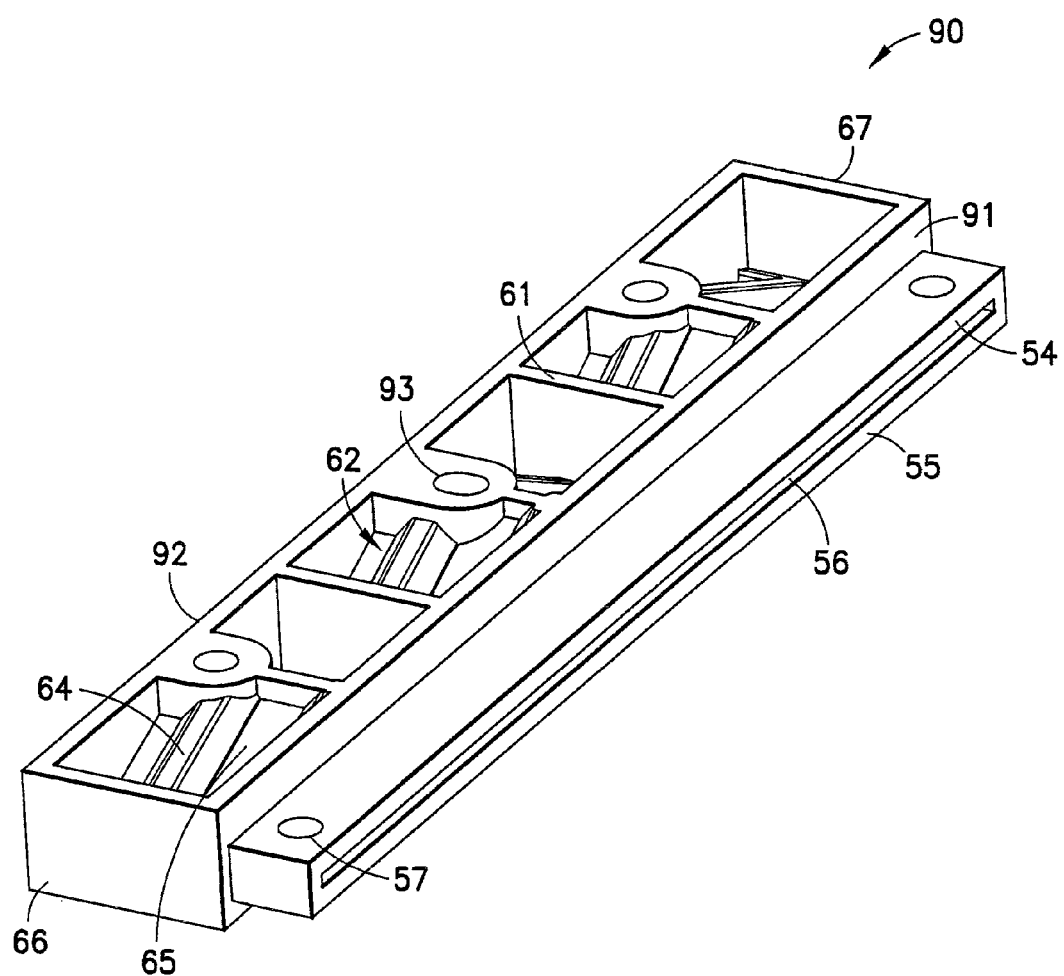
FIG. 13 is a top front perspective view of another end portion of the top plate of the media retainer assembly shown in FIG. 2.

Further, the configuration of the tongue and groove system may be varied. For instance, as shown in FIG. 13, the upper 54 and lower 55 tongues may be joined at the sides to form a box-like structure surrounding the gap 56. Likewise, as shown in FIG. 12, a single groove 83 may be formed in the second end wall 82 of an adjacent top plate 51, 80, 90, which receives both the upper 54 and lower 55 tongues (shown in FIG. 13) so as to secure the adjacent top plates 51, 80, 90 together end-to-end.

Figure 8:
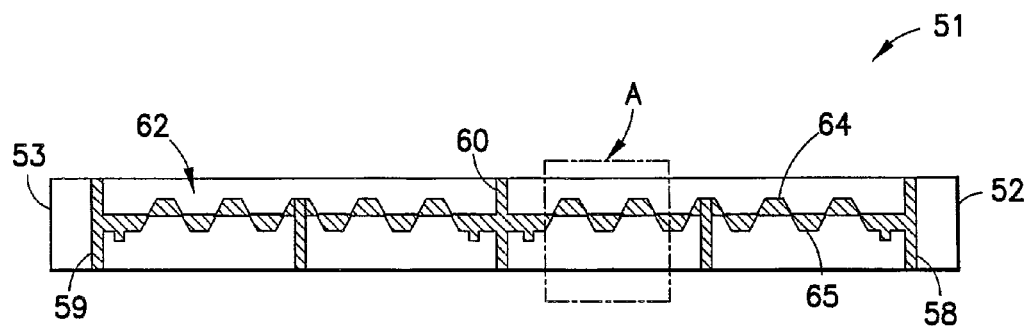
FIG. 8 is a longitudinal cross-section view of the intermediate portion of the top plate of the media retainer assembly.
Figure 9:
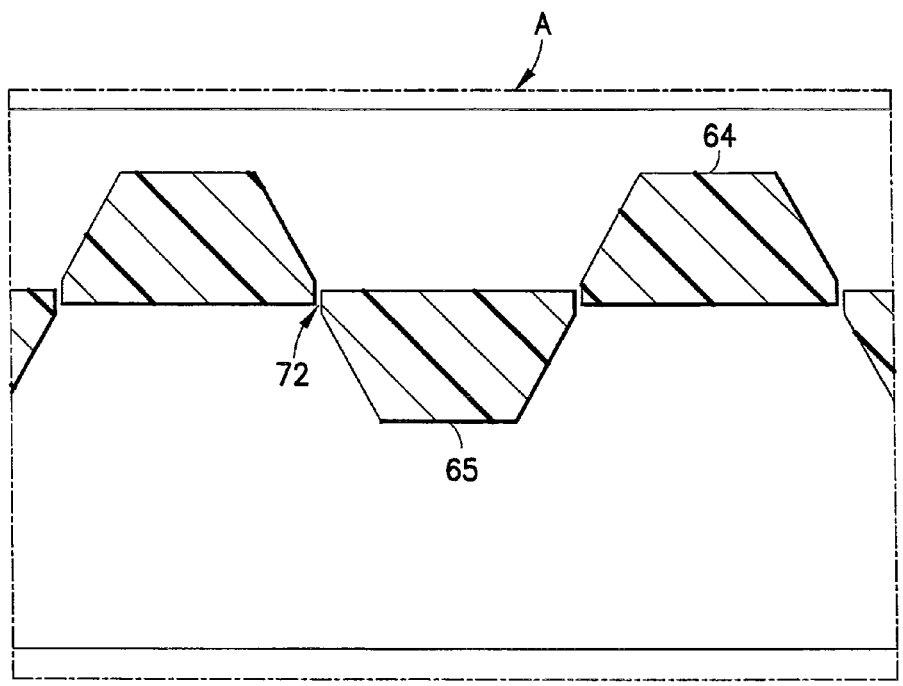
FIG. 9 is an enlarged view of FIG. 8 indicated by the area denoted "A" in FIG. 8.

As shown in FIGS. 8 and 9, each compartment 62 is integrally molded so as to include a plurality of trapezoidal bars 64, 65 arranged side-by-side in an alternating array, such that the bars 64 extend upwardly while the bars 65 extend downwardly. The top surfaces of the bars 64, 65 are thus non-parallel with the longitudinal axis of the underdrain block 11. It is to be appreciated that the bars 64, 65 may be parallel with the top surface of the underdrain block 11 according to the configuration of the underdrain block.

The bars 64, 65 are spaced slightly apart to form a gap therebetween, which defines a plurality of slots 72 formed between adjacent bars 64, 65, which place the top of the top plate assembly 50 in fluid communication with the bottom of the top plate assembly 50 so that filtrate is able to pass through the top plate assembly 50 to the bottom plate 100 and the underdrain block 11. It is to be appreciated that partial bars 64, 65 may be formed along transverse ribs 60 to provide a stronger connection to the ribs 60. The slots 72 are arranged and compartmentalized within the compartments 62 without obstruction so as to have a maximum length, which allows for free movement of scouring media 22 along the length of the slot 72 as will be discussed below. The sides of the slots 72 are minimally spaced, approximately 0.2 mm, to allow liquid to pass through the slots without creating excessive head loss or a large potential for clogging while preventing the passage of any filter media 12 through the top plate assembly 50.

The area of the slots 72 preferably remain consistent along the longitudinal length and transverse width of the top plate assembly to allow for equal flow of backwash water, backwash air, backwash air and water, and filtration liquid to minimize local hot or dead spots within the flow. Further, the bars 64, 65 are preferably able to move or deflect without increasing the effective spacing of the sides of the slots 72.

Figure 6:
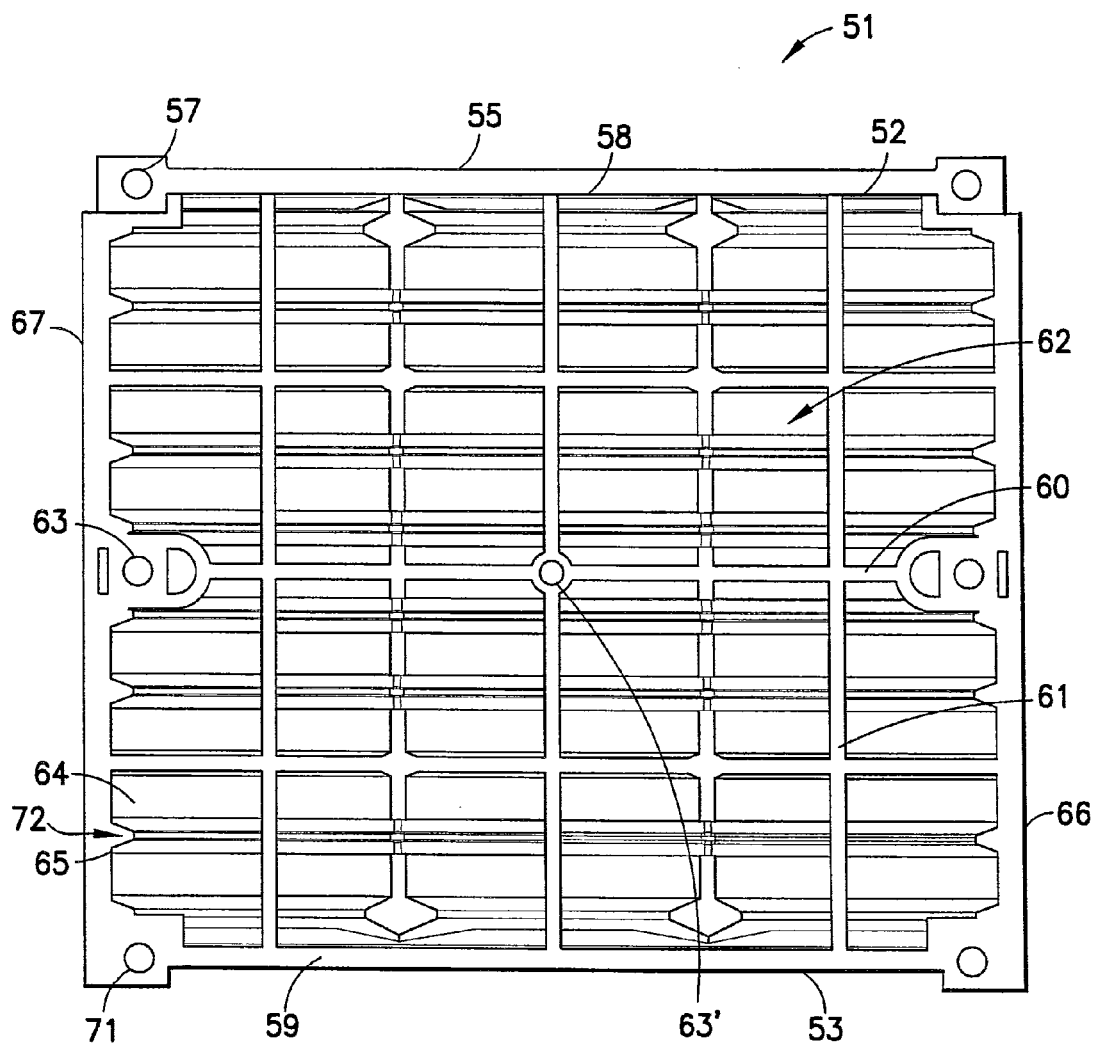
FIG. 6 is a bottom view of the intermediate portion of the top plate of the media retainer assembly.
Figure 7:
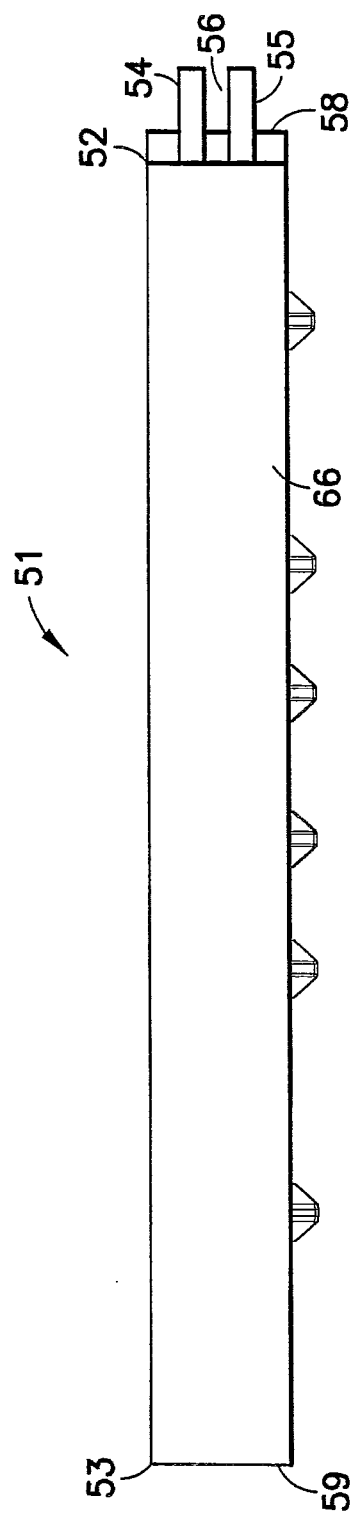
FIG. 7 is a side view of the intermediate portion of the top plate of the media retainer assembly.

It is to be appreciated that the top plates 51, 80, 90 are strong enough to support the filter media 12 and be able to be cleaned by a scouring media 22 from the bottom side, as will be discussed below. Thus, the top plates 51, 80, 90 according to the current embodiment provide maximum open surface area on the bottom side, as shown in FIG. 6, so that the scouring media 22 can reach or come in contact with as much of the area of each slot 72 as possible. Also, the top plates 51, 80, 90 are provided with stiffening ribs 60, 61, which contact the bottom plate 100 or the top of the underdrain block 11 to transfer the downward force of the filter media 12 and/or the differential pressure across the top plate assembly 50 to the underdrain block 11. By providing the reinforcement and stiffening ribs 60, 61 along the top of the top plate assembly 50, the forces acting upon the top plates 51, 80, 90 during backwash can be mitigated without interfering with contact between the scouring media 22 and the bottom of the top plates 51, 80, 90 and the slots 72. Additionally, the top plates 51, 80, 90 may be formed with a slight arch to increase their strength.

Figure 10:
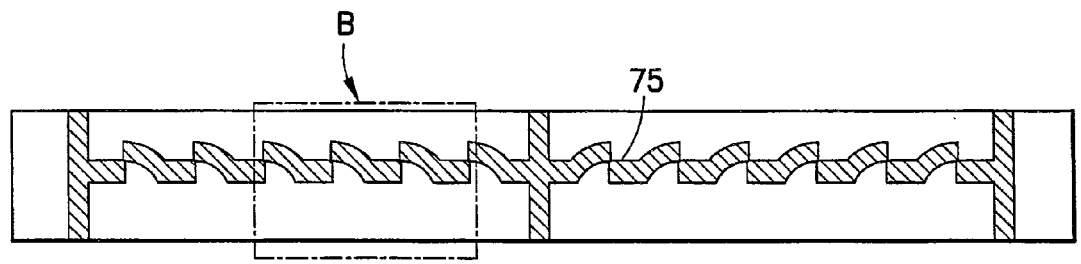
FIG. 10 is a longitudinal cross-section view of a portion of a top plate of the media retainer assembly according to another embodiment of the present invention.
Figure 11:
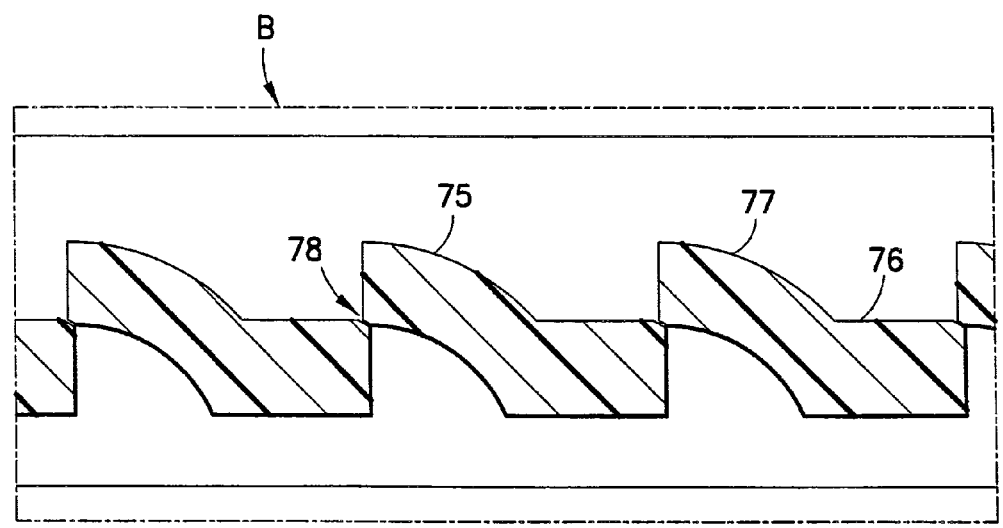
FIG. 11 is an enlarged view of FIG. 10 indicated by the area denoted "B" in FIG. 10.

As shown in FIGS. 10 and 11, according to an alternative embodiment of the present invention, the trapezoidal bars 64, 65 in each compartment are replaced with a plurality of louver shaped bars 75, which each have a flat portion 76 and an upwardly curving portion 77. A slot 78 is defined by a vertically extending gap formed between the flat portion 76 and the upwardly curving portion of adjacent louver shaped bars 75. It is to be appreciated that the top plate assembly 50 may be configured in any manner to allow filtered liquid to pass through while retaining the filter media 12 above the top plate assembly 50. For instance, the slots may be outwardly tapered toward the bottom side to allow scouring media 22 to partially enter the slots and provide more scouring action or the slots may be inwardly tapered toward the bottom side so that filter media 12 is able to partially enter the slots and provide scouring action from above. Further, the slots 72, 78 discussed above may be replaced with a plurality of tapered or straight holes.

With reference to FIG. 12, the first end top plate 80 of the top plate assembly 50 extends between first 81 and second 82 ends. As discussed above, a groove 83 is formed in the second end 82 for mechanically joining the second end 82 of the first end top plate 80 to the first end 52 of an intermediate top plate 51. Mounting holes 85 are also provided in the second end 82 for fasteners to attach the first end top plate 80 with the intermediate top plate 51, the bottom plate 100 and the underdrain block 11. Additional mounting holes 84 are provided at the first end 81 of the first end top plate 80 and intermediate mounting holes 63 are also formed within the transverse 60 and longitudinal 61 ribs. The transverse ribs 60 extend between the longitudinal walls 66, 67, and the longitudinal ribs 61 extend between the first 81 and second ends 82 to form a grid of compartments 62, each containing an array of bars 64, 65 as discussed above with reference to FIGS. 3-10.

With reference to FIG. 13, the second end top plate 90 of the top plate assembly 50 extends between first 91 and second 92 ends. Upper 54 and lower 55 tongues, each having mounting holes 57 and having a gap 56 formed therebetween, extend from the first end 91 of the second end top plate 90 for mechanically joining the first end 91 of the second end top plate 90 with the second end 53 of an adjacent intermediate top plate 51. Mounting holes 93 are formed in the second end 92 of the second end top plate 90 for fasteners to attach the second end top plate 90 with the bottom plate 100 and the underdrain block 11. Longitudinal ribs 61 extend between the first 91 and second 92 ends to form a grid of compartments 62 between the ends 91, 92 and the longitudinal walls 66, 67. Each compartment 62 contains an array of bars 64, 65 as discussed above with reference to FIGS. 3-10.

With respect to the top plate assembly 50, it is to be appreciated that the form of the top plate assembly may be varied according to alternative suitable configurations. For instance, the top plate assembly 50 may be formed as a single, integral piece. The top plate assembly 50 may be utilized by itself as a filter media retainer without the bottom plate 100 and the scouring media 22 by affixing the top plate assembly 50 directly to the underdrain block 11. Also, the scouring media 22 could be provided on top of the top plate assembly 50 to act as a support/barrier layer for retaining filter media 12 as well as a scouring media.

Figure 14:
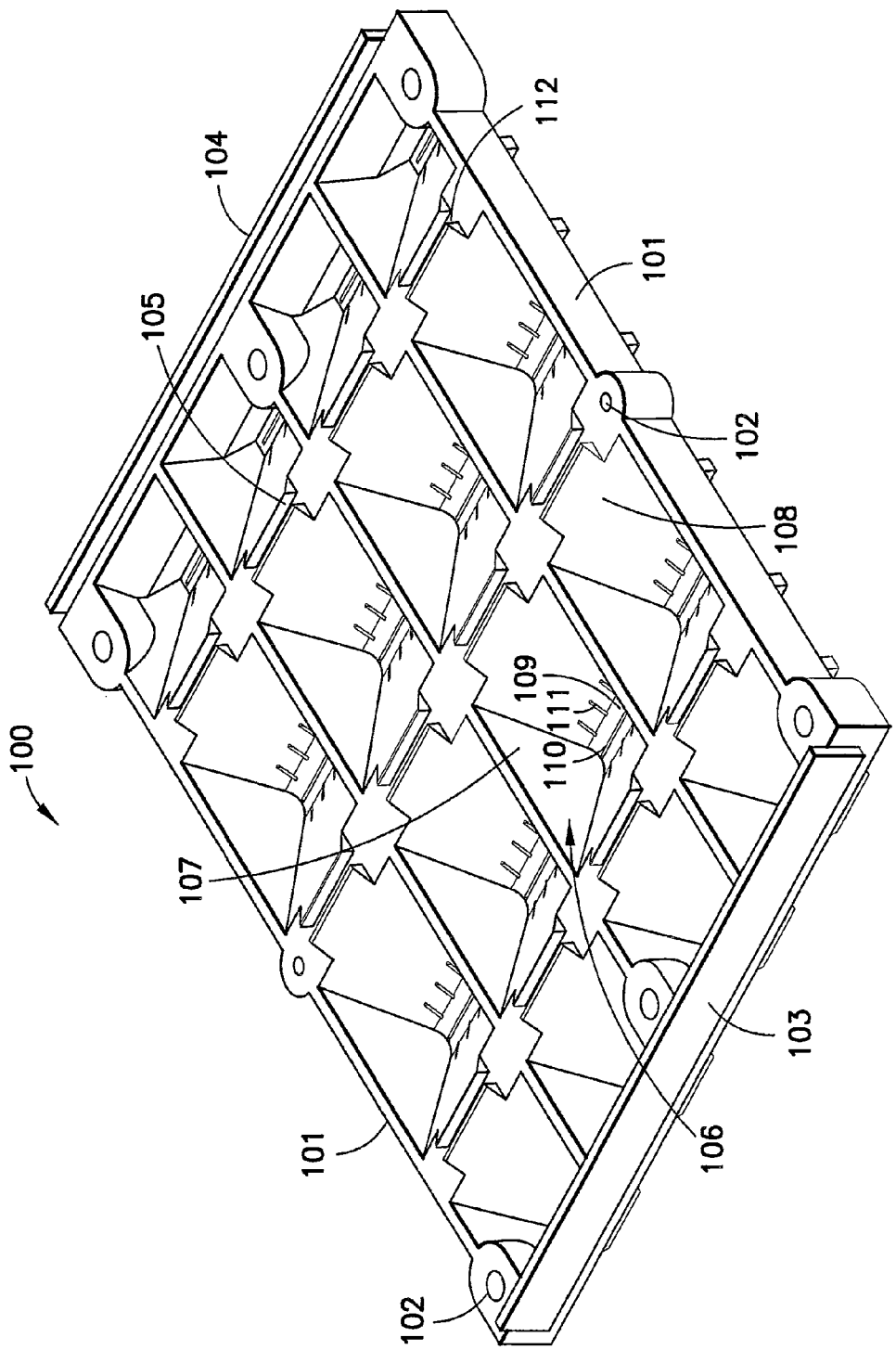
FIG. 14 is a top front perspective view of a portion of the bottom plate of the media retainer assembly shown in FIG. 2.
Figure 15:
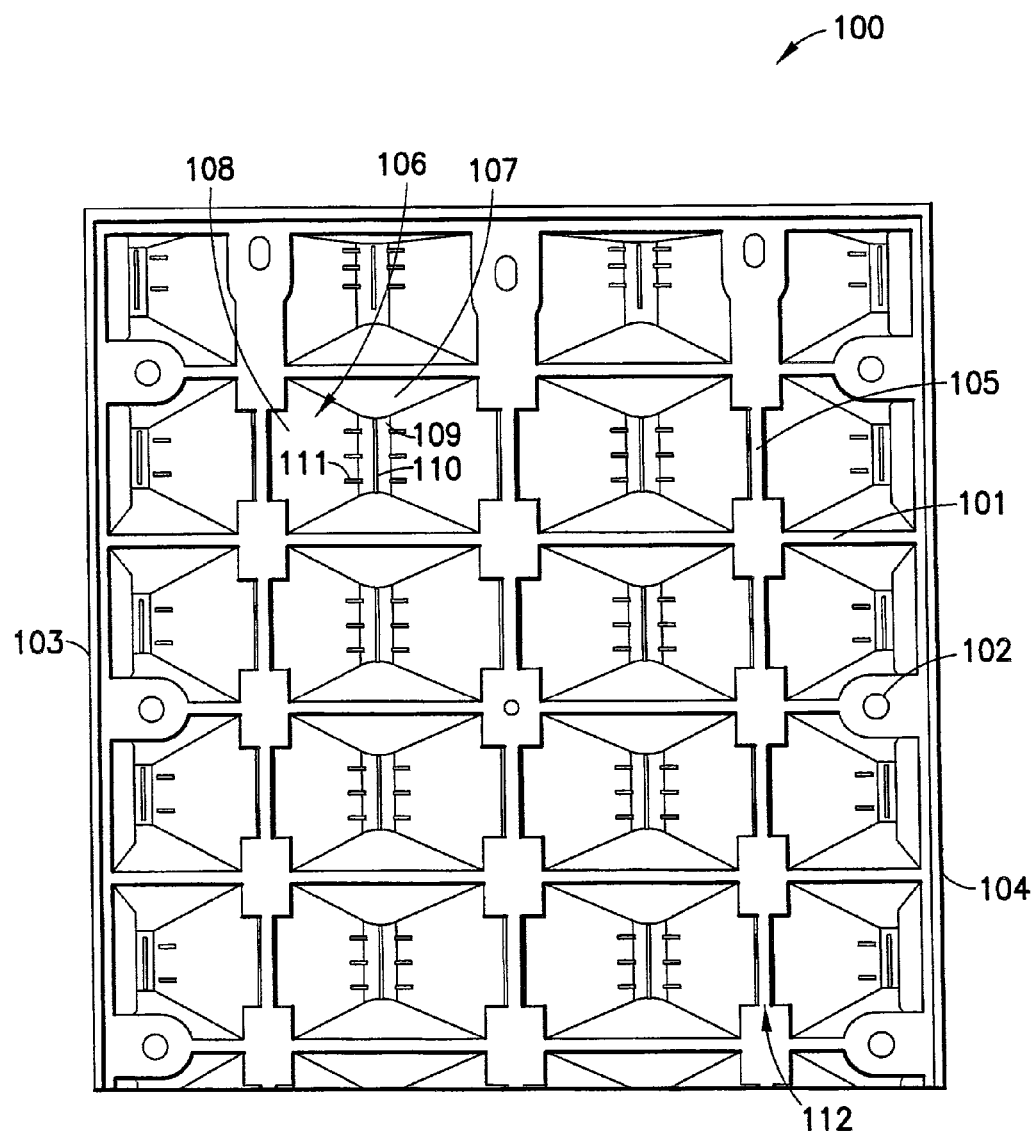
FIG. 15 is a top plan view of the bottom plate of the media retainer assembly.
Figure 16:
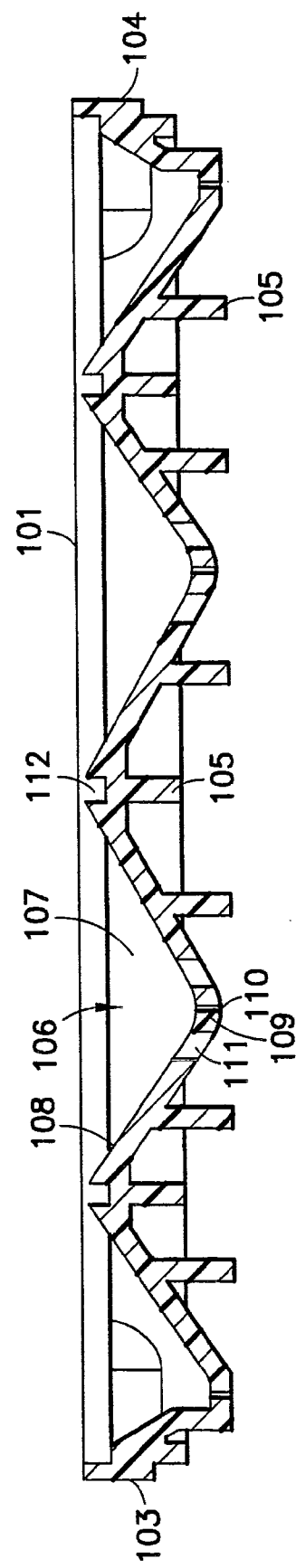
FIG. 16 is a transverse cross-section view of the bottom plate of the media retainer assembly.

With reference to FIGS. 14-16, a bottom plate 100 of the media retainer assembly 20 is shown. The bottom plate 100 is shown as a single piece, though it is to be appreciated that the bottom plate 100 may be formed by a plurality of interconnected pieces similar to the top plate assembly 50, as discussed above. The bottom plate 100 includes a plurality of transverse ribs 101 extending between opposite parallel longitudinal walls 103, 104 and a plurality of longitudinal ribs 105 extending the longitudinal length of the bottom plate 100. The bottom plate 100 is injection molded from a thermoplastic material, such as polypropylene, though it is to be appreciated that the bottom plate 100 may be formed from any suitable material and according to any suitable technique known to those having ordinary skill in the art.

The transverse 101 and longitudinal 105 ribs intersect to form a grid with a plurality of compartments 106 defined between the ribs 101, 105. The ribs 101, 105 may also have a plurality of mounting holes 102 formed therein, which align with the various mounting holes in the top plate assembly 50 for allowing fasteners to pass through the top plate assembly 50 and the bottom plate 100 and connect the top plate assembly 50 and the bottom plate 100 to the underdrain block 11. Each compartment 106 includes two opposing downwardly sloped end walls 107 extending inwardly from the transverse ribs 101 and two opposing downwardly sloped side walls 108 extending inwardly from the longitudinal ribs 105. The end walls 107 and the sidewalls 108 are connected by a bottom 109 to form a hopper structure in the compartment 106. As shown in FIGS. 14 and 16, the sidewalls 108 of each hopper compartment 106 extend past the level of the longitudinal ribs 105 so as to form grooves 112 for receiving and retaining the longitudinal ribs 61 of the top plate assembly 50, as shown in FIGS. 17 and 18.

The top surface of each compartment 106 of the bottom plate 100 is in fluid communication with the bottom surface of the bottom plate 100 and the underdrain block 11 via a longitudinal slot 110 formed in the base 109 of the compartment and extending between the opposing end walls 107 and a plurality of short slots 111 extending up each sidewall 108 of the compartment 106 perpendicular to the longitudinal slot 110. The longitudinal slot 110 and the short slots 111 have a sufficient width so as to prevent scouring media 22 from passing through the bottom plate 100, while not creating any significant head loss in the assembly 10 during filtering and backwashing operations thereby allowing for a desired flow velocity during backwashing and minimizing biology from bridging the slots 110, 111 to produce the potential of clogging of the bottom plate 100 due to biological and chemical scaling. According to an embodiment of the present invention, the slots 110, 111 have a thickness of approximately of 1 mm.

Figure 17:
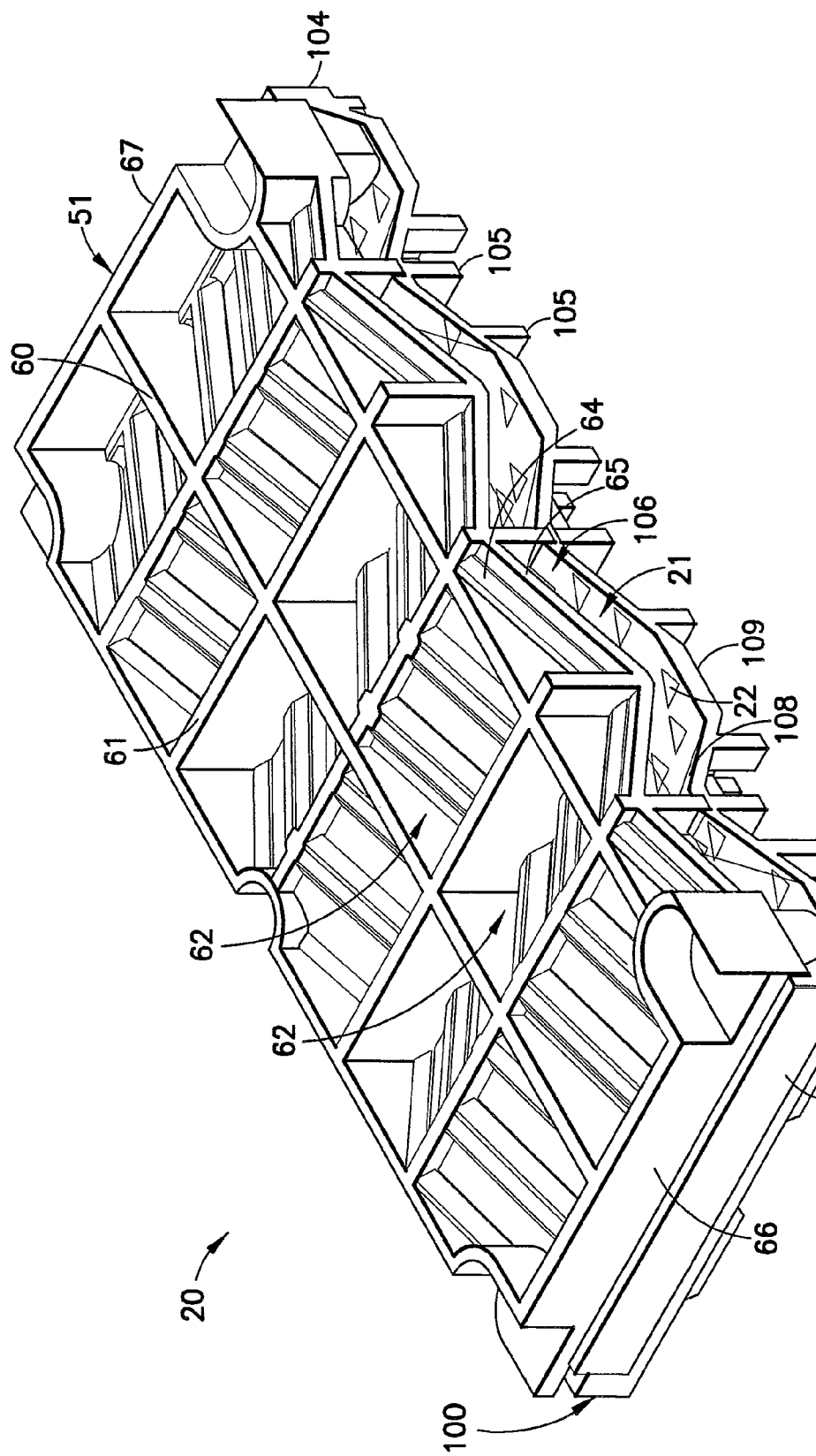
FIG. 17 is a perspective cross-section view of the media retainer assembly shown in FIG. 1.
Figure 18:
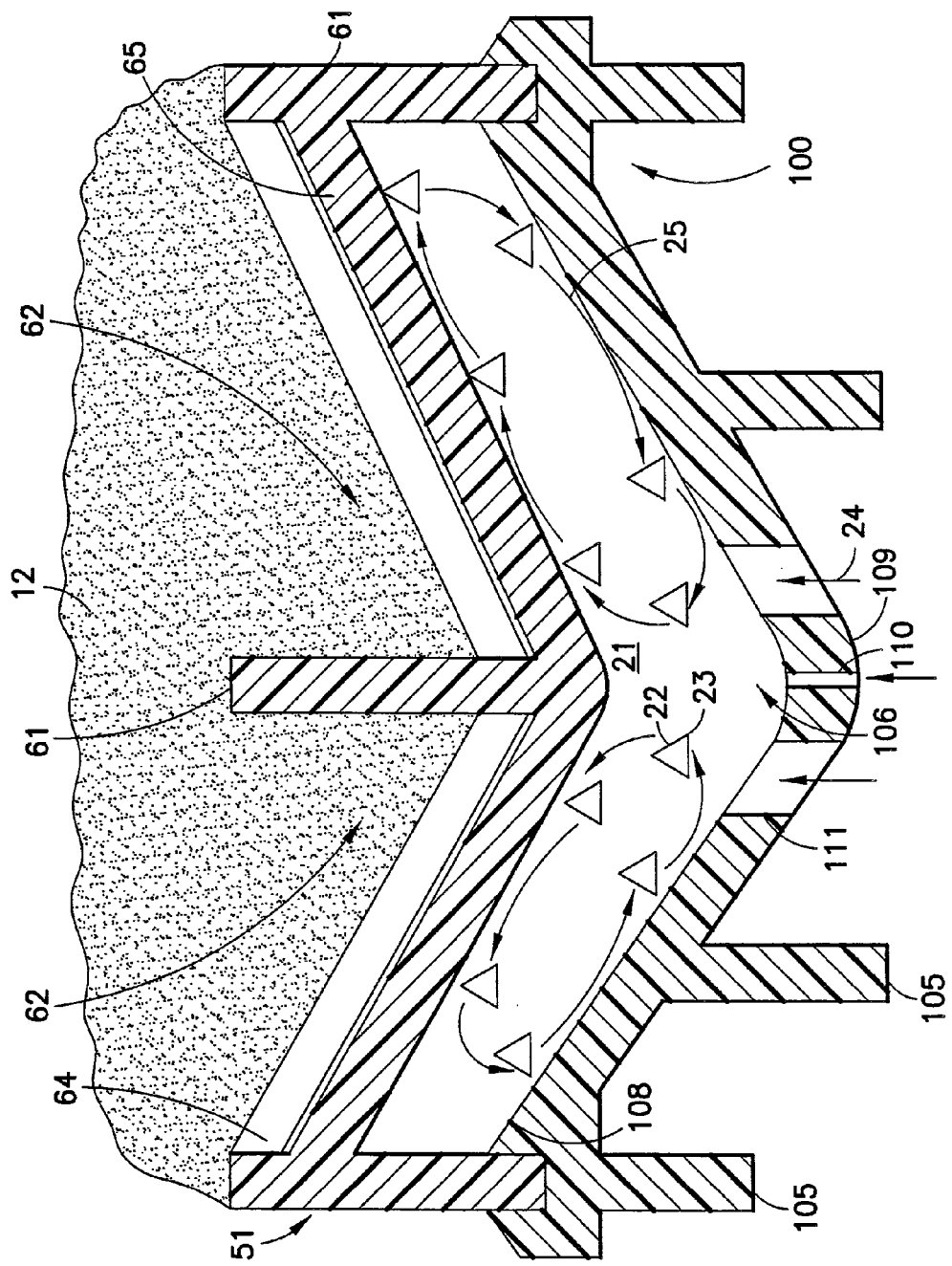
FIG. 18 is an enlarged transverse cross-section view of the media retainer assembly shown in FIG. 17.
Figure 19:
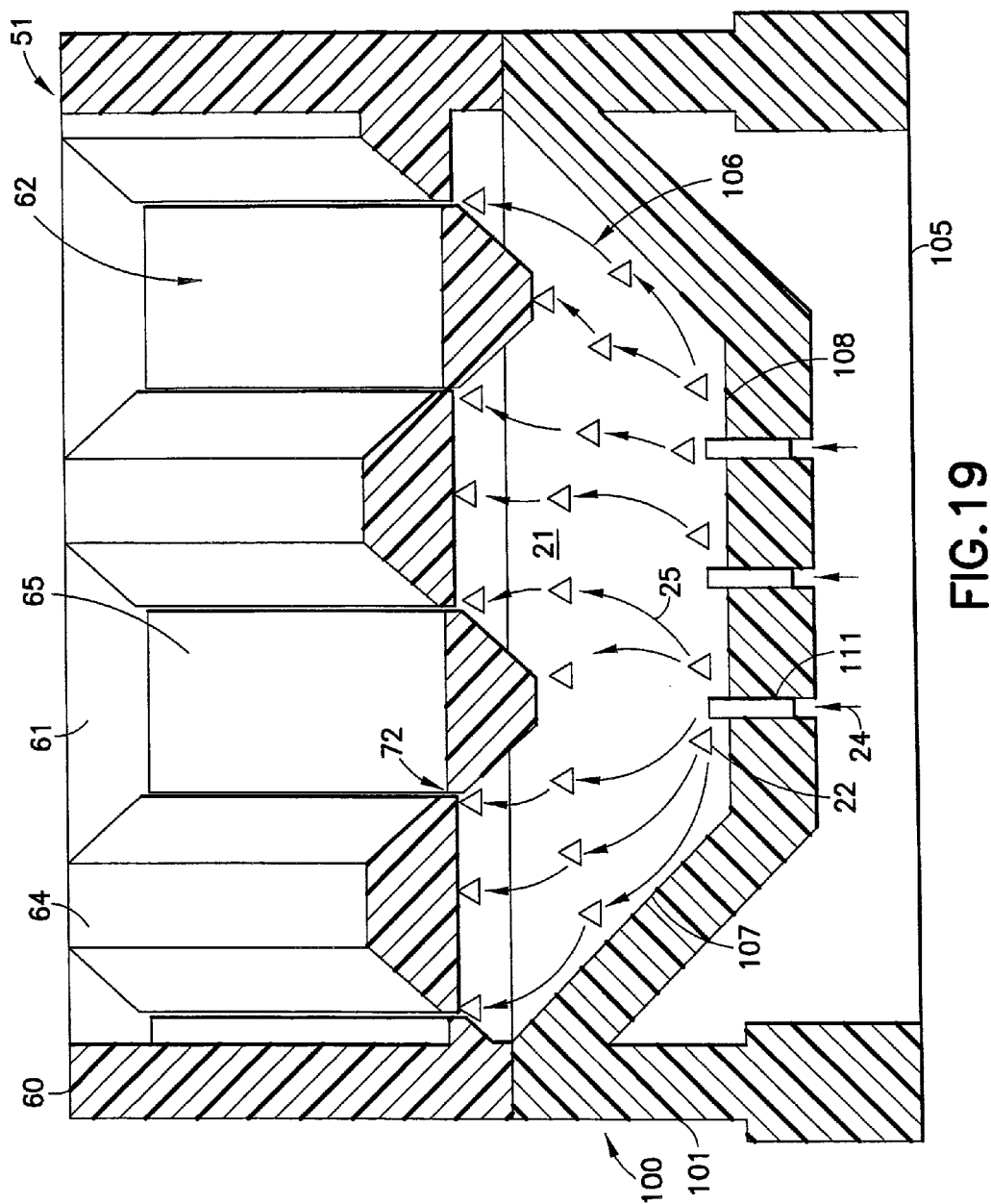
FIG. 19 is an enlarged longitudinal cross-section view of the media retainer assembly shown in FIG. 17.
Figure 20A:
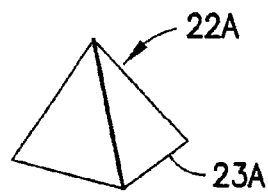
FIGS. 20A, 20B, 20C, 20D, 20E, and 20F illustrate various shapes of scouring media particles according to the present invention.
Figure 20B:
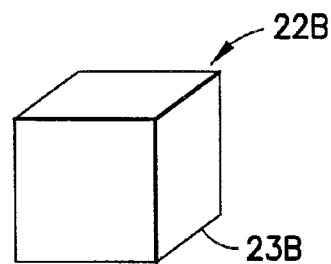
Figure 20C:
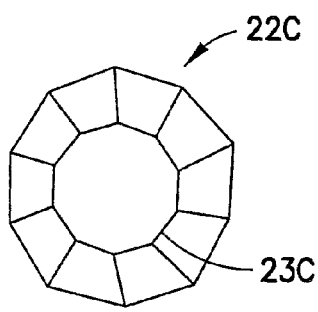
Figure 20D:
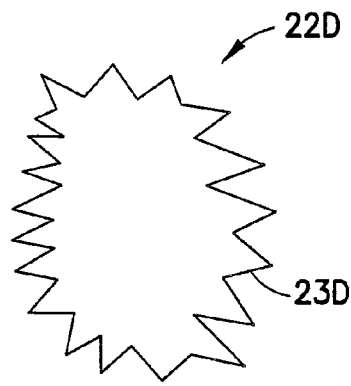
Figure 20E:
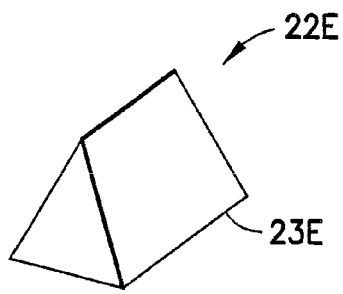
Figure 20F:
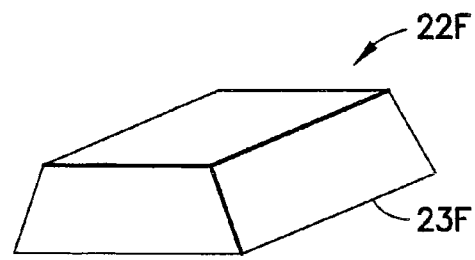

As shown in FIGS. 17-19, each hopper-shaped compartment 106 acts as a reservoir for containing scouring media 22. The top plate assembly 50 is placed on the bottom plate 100 so that each hopper-shaped compartment 106 underlies two adjacent compartments 62 of the top plate assembly 50 in the transverse direction to form a scouring chamber 21 between the walls 107, 108 of the hopper-shaped compartments 106 and the bottom surfaces of the bars 64, 65 within the transversely adjacent compartments 62. The scouring media 22 includes at least one edge 23, which is provided to clean biological and chemical scaling from the surfaces of the hopper-shaped compartments 106, the bottom surfaces of the bars 64, 65 of the compartments 62 of the top plate assembly 50, and the slots 72 formed between the bars 64, 65, by a scraping action along these surfaces and along the slots as the individual particles of the scouring media 22 are circulated through the scouring chamber 21 during backwashing of the filter assembly 10.

The slots 110, 111 are oriented perpendicular to the bottom plate 100 so as to create a vertical discharge of liquid during backwashing operations. The location and size of the slots 110, 111 allow for the creation of high velocity zones within the scouring chamber 21. The compartment 106 is provided with a hopper shape while the slots 72 of adjacent compartments 62 of the top plate assembly 50 lie in a plane parallel to each sidewall 108 of the hopper-shaped compartment 106 to minimize the distance between the slots 72 and the bottom surfaces of the bars 64, 65 and the surfaces of the sidewalls 108 of the hopper-shaped compartment 106 and enhance the movement of the scouring media 22 along the slots 72 during a backwashing operation by reducing dead areas where scouring media particles 22 are not under the influence of flow velocities during backwashing. Further, the angled end walls 107 and sidewalls 108 of the hopper-shaped compartment 106 allow the scouring media 22 to slide toward the base portion 109 of the compartment 106 due to gravity.

With reference to FIGS. 17-19, during a backwashing operation, liquid will flow upward through the slots 110, 111 in each hopper-shaped compartment 106 as indicated by the arrows 24. The high velocity zones of flow created by the slots 110, 111 in the hopper-shaped compartment 106 will move the scouring media 22 in a plurality of flow streams indicated by the arrows 25 to create a swirling action within the scouring chamber 21. To that end, liquid passing through the longitudinal slot 110 in the base portion 109 of the hopper-shaped compartment 106 will initially act upon the scouring media 22 to begin movement, and liquid passing through the short transverse slots 111 will act upon the scouring media 22 to continue the movement of the scouring media particles 22 upward, toward the bottom of the bars 64, 65 of the top plate 51, causing collision between the scouring media particles 22 and the surfaces of the top 51 and bottom 100 plates. As shown in FIGS. 18 and 19, the scouring media particles 22 will move upwardly and transversely along the bars 64, 65 and the slots 72 so that the at least one edge 23 scrapes the chemical and biological scaling away from bottoms of the bars 64, 65 and within the slots 72 to prevent clogging of the slots 72. The scouring particles 22 will then pass downward along the walls 107, 108 of the hopper-shaped compartment 106 to scrape scaling from these surfaces as well.

With respect to the bottom plate 100, it is to be appreciated that the form of the bottom plate 100 may be varied according to alternative suitable configurations. For instance, the scouring media 22 need not be provided within the scouring chambers 21. The slots of the bottom plate 100 may be angled for non-vertical discharge from the top surface of the bottom plate 100, which allows for directed flow and velocities that may enhance performance of the scouring media 22 on the top plate assembly 50. Further, the bottom plate 100 may be integrally molded with the top surface of the underdrain block 11 via a structural foam process under low pressure such that the underdrain block 11 itself acts as the bottom plate. Further, the bottom plate 100 may be used as a filter media retainer in place of the top plate assembly 50.

With respect to the scouring media 22, it is to be appreciated that the scouring media particles 22 are formed large enough and with a sufficiently high specific gravity so that they settle toward the base portions 109 of the hopper-shaped compartments 106, but will not pass through the top 50 or bottom 100 plates or be held against the bottom surfaces of the top plate 50 during backwashing or filtration operations. Additionally, the scouring media particles 22 are formed small enough and with a low enough specific gravity so that the flow velocities through the bottom plate 100 will be sufficient to move the scouring media particles 22 to create the scouring action. Further, the particles of the scouring media 22 are large enough to leave gaps between individual particles so as to reduce the coverage area of the scouring media particles 22 and not cover or occlude the slots 110, 111 in the bottom plate 100 in order to reduce or minimize the amount of head loss created by the scouring media 22 during filtration operations. It is to be appreciated that the particles of the scouring media 22 may be formed from any material known to be suitable to those having ordinary skill in the art such as ceramic and porcelain materials, granulated plastic materials, walnut shells, gravel and silicate compounds.

At least one edge 23 is provided to the individual particles of the scouring media 22 to increase the contact effectiveness of the particles and enhance the contact area of the particles with the open area of the slots 72 in the top plate assembly 50.

It is to be appreciated that the particles of the scouring media 22 may be formed in any shape or configuration known to be suitable to those having ordinary skill in the art, which includes at least one edge 23, is not long and slender so as to not be held against the bottom of the top plate 50 during scouring, and has a minimized effective plugging area. For instance, as shown in FIGS. 20A-20F, the scouring media 22 may be pyramidal 22A with edges 23A, cubical 22B with edges 23B, polyhedral 22C with edges 23C, irregular 22D with edges 23D, triangular 22E with edges 23E, or trapezoidal 22F with edges 20F. Alternatively, the scouring media 22 may be formed of spherical particles, though the effectiveness of such particles in removing biological and chemical scaling is limited.

According to an alternative embodiment of the present invention, an anti-microbial agent, such as silver ion and zeolyte manufactured by Agion Technologies, may be applied to the surfaces of the particles or incorporated inside the particles to reduce the amount of biology on the surface of the scouring media 22 and to enhance cleaning of the bottom sides of the top plate assembly 50 and the slots 72 in the top plate assembly 50.

The present invention also includes a method of removing biological and chemical scaling from a media retainer including: providing at least one chamber below a bottom surface of the media retainer; providing scouring particles within the at least one chamber; providing flow of fluid through the chamber to circulate the scouring particles within the chamber such that they abrade the bottom surface of the media retainer. The method may be utilized with an apparatus as described above or may use an apparatus having any suitable configuration of media retainer and filter assembly that provides at least one chamber beneath the media retainer, scouring particles, and a configuration allowing for fluid flow through the chamber to circulate the scouring particles. The flow of fluid through the chamber may be provided by a backwash of the filter assembly and the chamber may include a plurality of hopper-shaped compartments having angled walls, a bottom portion, at least one slot in the bottom portion, and at least one slot in at least one of the angled walls to provide increased circulation of the scouring particles when the fluid flows through the chamber.

While several embodiments of a gravity or pressure filter assembly that includes a clog resistant media retainer assembly were described in the foregoing detailed description, those skilled in the art may make modifications and alterations to these embodiments without departing from the scope and spirit of the invention. Accordingly, the foregoing description is intended to be illustrative rather than restrictive. The invention described hereinabove is defined by the appended claims and all changes to the invention that fall within the meaning and the range of equivalency of the claims are embraced within their scope.

The invention claimed is:

1. A media retainer assembly for retaining filter media in a gravity filter assembly, the media retainer assembly comprising:
a top plate for supporting the filter media, the top plate having a top surface, a bottom surface and a plurality of openings extending therethrough;
a bottom plate having a top surface and a plurality of openings extending therethrough; and
scouring media, the scouring media being adapted to abrade the surfaces of the top and bottom plates,
wherein the top plate is connected to the bottom plate such that the top surface of the bottom plate is spaced from the bottom surface of the top plate to define at least one chamber between the top plate and the bottom plate, the top surface of the top plate is in fluid communication with the chamber via the openings in the top plate, and the scouring media is supported by the bottom plate within the at least one chamber,
wherein the media retainer assembly is adapted to be connected to an underdrain block of the gravity filter assembly such that the chamber is in fluid communication with the underdrain block via the openings in the bottom plate,
wherein the top plate, the bottom plate, or both comprise a plurality of separable pieces, and
wherein adjacent separable pieces of the top plate, the bottom plate, or both are connected by at least one tongue disposed on one piece fitted within at least one groove formed in an adjacent piece.

2. The media retainer assembly according to claim 1, wherein the top plate includes a plurality of parallel bars spaced apart from one another and the openings in the top plate are slots defined between adjacent parallel bars of the top plate.

3. The media retainer assembly according to claim 2, wherein the parallel bars have a trapezoidal shape.

4. The media retainer assembly according to claim 2, wherein the top plate further includes a plurality of ribs and the parallel bars extend between adjacent ribs.

5. The media retainer assembly according to claim 2, wherein the parallel bars are downwardly sloped with respect to a vertical axis of the assembly.

6. The media retainer assembly according to claim 1, wherein the scouring media comprises a plurality of scouring particles, each scouring particle having at least one abrading edge.

7. The media retainer assembly according to claim 1, wherein the bottom plate includes a plurality of laterally extending ribs and longitudinally extending ribs arranged in a grid pattern and a plurality of hopper-shaped compartments defined between the ribs, the openings in the bottom plate are slots formed in each of the hopper-shaped compartments, and the at least one chamber is a plurality of chambers defined between each hopper-shaped compartment, and the bottom surface of the top plate.

8. The media retainer assembly according to claim 1, wherein the top surface of the bottom plate is parallel to the bottom surface of the top plate.

9. The media retainer assembly according to claim 1, wherein the top plate, the bottom plate, and the scouring media are preassembled prior to installation in the filter assembly.

10. The media retainer assembly according to claim 1, wherein the top plate further comprises a plurality of stiffening ribs and the bottom plate further comprises grooves for receiving and retaining the stiffening ribs.

11. The media retainer assembly according to claim 1, wherein the bottom plate is an integral portion of an underdrain block of the filter assembly.

12. A media retainer assembly for retaining filter media in a gravity filter assembly, the media retainer assembly comprising:
a top plate for supporting the filter media, the top plate having a top surface, a bottom surface and a plurality of openings extending therethrough;
a bottom plate having a top surface and a plurality of openings extending therethrough; and
scouring media, the scouring media being adapted to abrade the surfaces of the top and bottom plates,
wherein the top plate is connected to the bottom plate such that the top surface of the bottom plate is spaced from the bottom surface of the top plate to define at least one chamber between the top plate and the bottom plate, the top surface of the top plate is in fluid communication with the chamber via the openings in the top plate, and the scouring media is supported by the bottom plate within the at least one chamber, wherein the media retainer assembly is adapted to be connected to an underdrain block of the gravity filter assembly such that the chamber is in fluid communication with the underdrain block via the openings in the bottom plate, and wherein the top plate further comprises a plurality of stiffening ribs and the bottom plate further comprises grooves for receiving and retaining the stiffening ribs.

* * * * *